United States Patent
Ng et al.

(10) Patent No.: US 11,356,409 B1
(45) Date of Patent: Jun. 7, 2022

(54) NETWORK ADDRESS ALLOCATION MANAGEMENT USING PREFIX ALLOCATION TREES

(71) Applicant: Amazon Technologies, Inc., Seattle, WA (US)

(72) Inventors: Benjamin Kaiwen Ng, Falls Church, VA (US); Jason Goelitz, Oakton, VA (US); Eric Andrew Rubin-Smith, Fairfax, VA (US); Lee Alan Wildes, Herndon, VA (US); Adam Gregory Cogen, Reston, VA (US); Nam Quy Nguyen, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/215,994

(22) Filed: Mar. 29, 2021

(51) Int. Cl.
| | |
|---|---|
| *H04L 61/5061* | (2022.01) |
| *G06F 9/54* | (2006.01) |
| *H04L 101/35* | (2022.01) |
| *G06F 16/901* | (2019.01) |
| *G06F 9/30* | (2018.01) |
| *G06F 9/50* | (2006.01) |

(52) U.S. Cl.
CPC ...... *H04L 61/2061* (2013.01); *G06F 9/30029* (2013.01); *G06F 9/50* (2013.01); *G06F 9/541* (2013.01); *G06F 16/9014* (2019.01); *H04L 61/305* (2013.01)

(58) Field of Classification Search
CPC ... H04L 61/2061; H04L 61/305; G06F 9/541; G06F 9/30029; G06F 9/50; G06F 16/9014
See application file for complete search history.

(56) References Cited

U.S. PATENT DOCUMENTS

| | | | | |
|---|---|---|---|---|
| 2014/0003436 A1* | 1/2014 | Wang | ............... | H04L 45/7457 370/392 |
| 2014/0068211 A1* | 3/2014 | Fiske | ............... | G06F 3/0631 711/202 |

* cited by examiner

*Primary Examiner* — Azizul Choudhury
(74) *Attorney, Agent, or Firm* — Thomas | Horstemeyer, LLP (57) ABSTRACT

Disclosed are various embodiments for managing network address allocations using prefix allocation trees. In one embodiment, a request is received to allocate a network address block. The request specifying a prefix size for the network address block. A particular network address block having the prefix size that is allocatable is determined based at least in part on a prefix allocation tree representing the available and allocated network address space. The prefix allocation tree is updated to indicate that the particular network address block is allocated. An identification of the particular network address block is returned in response to the request to allocate the network address block.

20 Claims, 7 Drawing Sheets

NETWORK ADDRESS ALLOCATION MANAGEMENT USING PREFIX ALLOCATION TREES

BACKGROUND

Network addresses for the Internet are specified in respective addressing schemes for Internet Protocol version 4 (IPv4) and Internet Protocol version 6 (IPv6). IPv4 addresses are 32 bits in length and are usually visually represented by dotted quad notation, with four octets, each ranging from 0 to 255 and separated by periods. There are roughly $2^{32}$ or 4,294,967,296 addresses, less reserved and/or system address ranges. The use of Classless Inter-Domain Routing (CIDR) allowed for allocation of addresses using variable length subnet masks and accompanying arbitrary length network prefixes. For example, a network "192.168.1.0/24" indicates a network prefix 24 bits in length using CIDR notation, with the equivalent subnet mask of "255.255.255.0" being implied by the "/24" CIDR notation. While four billion addresses may seem like a large number, every top-level block of IPv4 addresses has already been allocated. Because of IPv4 address exhaustion, the Internet is transitioning to the use of IPv6, which uses 128-bit addresses and $2^{128}$ possible addresses. IPv6 addresses are represented as eight groupings of four hexadecimal digits, each ranging from 0000 to ffff, and separated by colons.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the use of prefix allocation trees for managing network address allocations. Organizations that manage networking infrastructure may need to keep track of network address allocations in order to know what address ranges are already allocated, or conversely, are unallocated and available for allocation. In various scenarios, a customer may be seeking a new network address allocation with at least a certain number of network addresses to configure a subnetwork in a cloud provider network, where the addresses are allocated from a pool of available addresses from the cloud provider or from a pool of addresses that the customer already controls. Using CIDR notation, the "/X" number of bits subtracted from the number of bits in the address yields the number of addresses available in a network according to the formula $2^{(32-X)}$ for IPv4 or $2^{(128-X)}$ for IPv6. For example, a request for a "/28" network allocation in IPv4 would be for $2^{(32-28)}$ or 16 contiguous addresses.

It is also important to avoid unnecessary fragmentation of larger network address blocks to preserve them for customers who may require such larger allocations. To illustrate, within a "/30" block of four contiguous addresses in IPv4 are two "/31" blocks of two contiguous addresses each. Allocating a single address from the first "/31" block and a single address from the second "/31" block would make it impossible to allocate an entire "/31" block of two addresses. Thus, an allocation management system should seek to allocate both single addresses (each considered "/32" blocks) within one "/31" block, thus preserving the entire remaining "/31" block for a possible future allocation request of two contiguous addresses.

With IPv4, network address allocation management could be done with a relatively simple table structure in a database. However, such an approach is not practical or scalable for IPv6, particularly in locating free space of a certain size that can be allocated to the customer within the global pool of network addresses. This is a problem because traditional indexes index data but not the absence of data, and the IPv6 address space is effectively infinite. Thus, occupying all the free space with indexable records is not practical. Moreover, traditional data structures are designed for single-threaded machines and do not scale well to multiple machines or concurrent mutations. Also, making a network call to obtain data from a remote database is five orders of magnitude more computationally expensive than dereferencing a pointer, such as in traditional data structures.

Various embodiments of the present disclosure introduce and optimize a prefix allocation tree data structure in order to manage network address allocation. The prefix allocation tree may also be referred to as a trie. A trie is a type of search tree data structure that can be used to store sequences of values, in which each node represents a single string or a prefix, and all the children of a node have a common prefix of the string associated with that parent node. The presently disclosed trie can be distributed across a number of separate computing devices, for example across a number of different servers in a cloud computing environment.

The prefix allocation tree provides the advantages of representing all of the IPv6 space efficiently; providing transactional, linear-time, O(depth) create, read, update, and delete operations; providing transactional, linear-time, O(depth) allocations of arbitrary size; and providing reliable, non-blocking time-bound snapshots. Although the present disclosure focuses on the example of network address allocation, the prefix allocation tree may be used in any other context in which a power-of-two allocator may be desired, which could include applications such as assigning seats in a concert hall or arena, reserving space in an exhibition hall, allocating time slots on a calendar, and so forth.

Figure 1A:
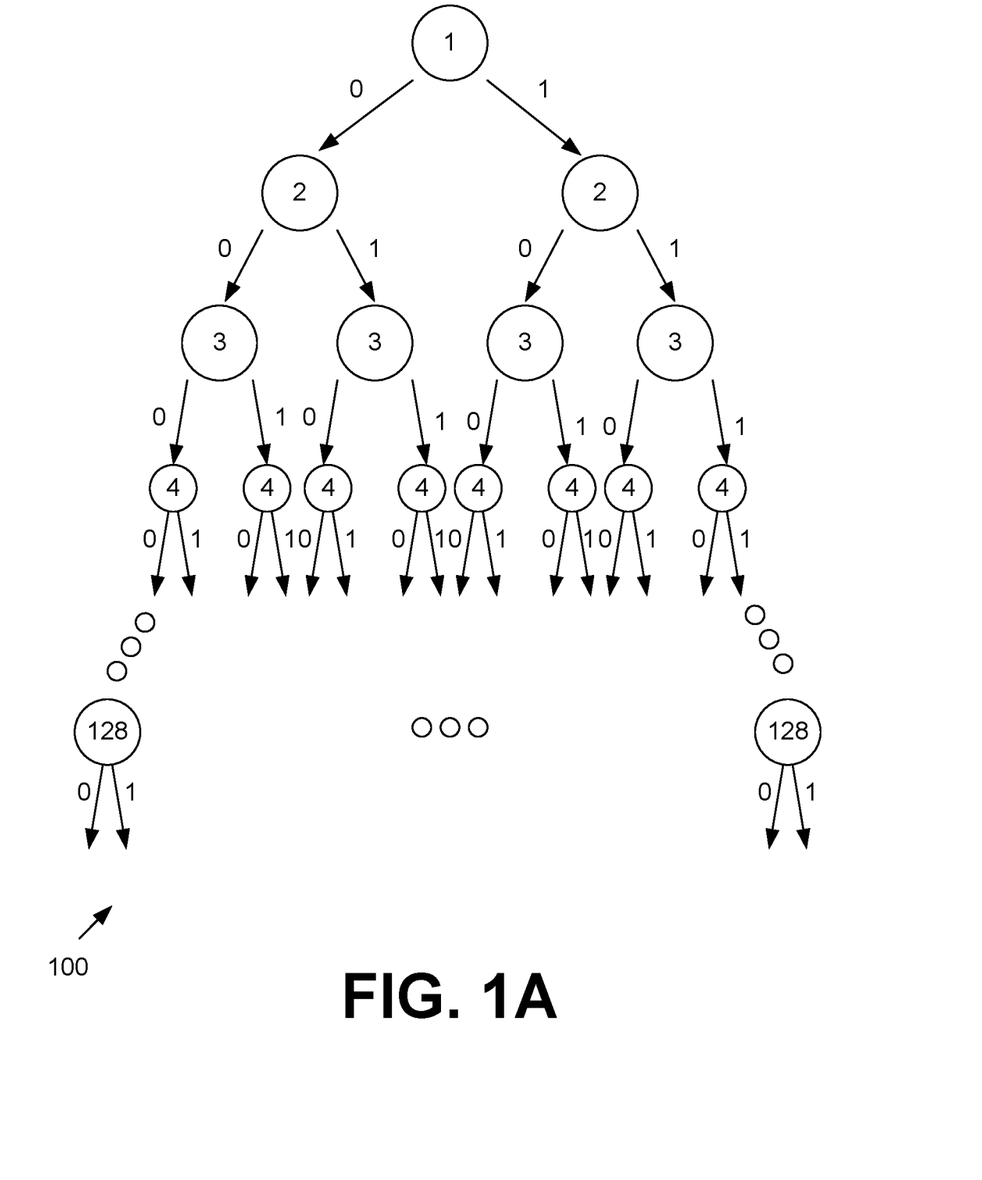
FIGS. 1A-1C are drawings of example prefix allocation trees according to various embodiments of the present disclosure.

Turning now to FIG. 1A, shown is a drawing of an example prefix allocation tree 100 configured for a 128-bit network address, such as an IPv6 network address. Each node corresponds to a level in the tree 100 and a bit position in the corresponding network address, while the transition corresponds to the data encoded by the tree 100. A binary alphabet ("0" and "1") are used in this example. At each node, the bit value may be either "0" or "1", using this alphabet. The tree 100 has a depth of 128, corresponding to the 128 bits represented. Traversing the tree 100 using the leftmost transitions yields the value of "0" 128 times, or the address ":::::::", while traversing the tree 100 using the rightmost transitions yields the value of "1" 128 times, or the address "ffff:ffff:ffff:ffff:ffff:ffff:ffff:ffff".

At each node in the tree 100, a pointer can provide data relating to the allocation of the network address space falling under that corresponding node. Such data can include whether the network address space is available within a pool or is owned by a network services provider or a customer, and whether the network address space (or a portion thereof) has been allocated. With 128 levels, the vast majority of nodes would serve no purpose and would add unnecessary round-trip latencies during path traversals.

Figure 1B:
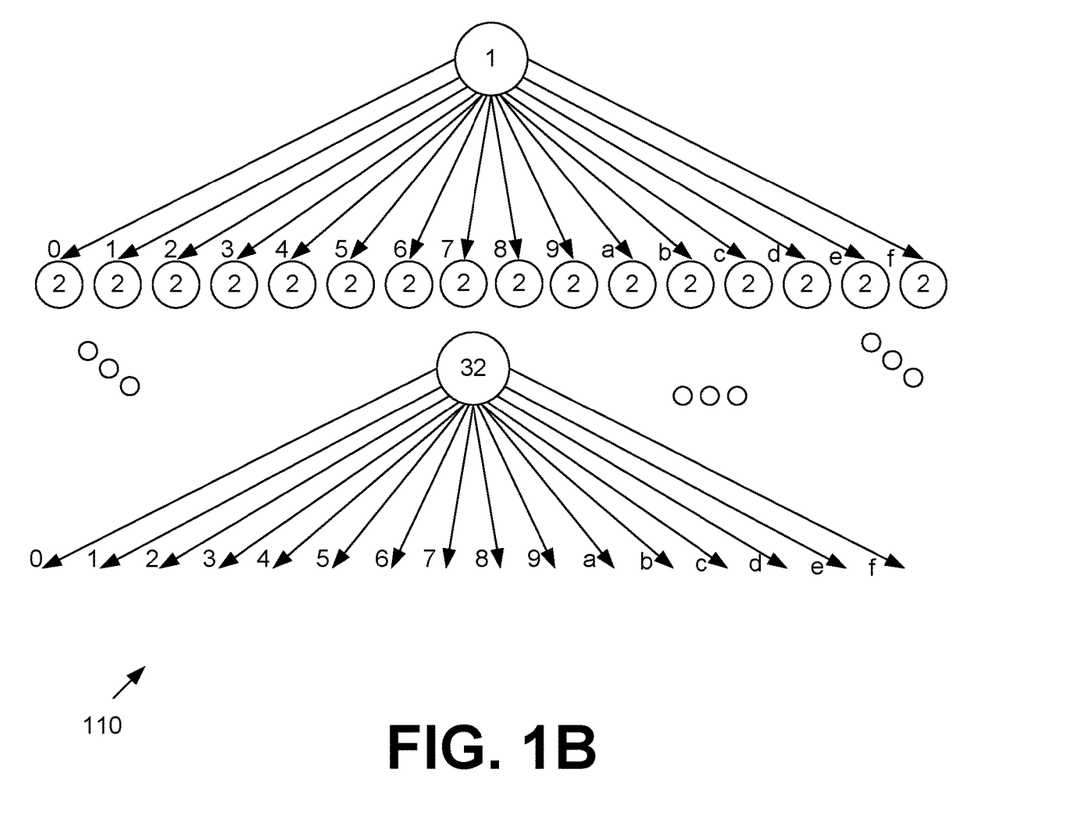

FIG. 1B shows another example of a prefix allocation tree 110, but this time using the hexadecimal alphabet ("0" thorough "f") instead of the binary alphabet. This prefix allocation tree 110 also represents the entire 128-bit address space of IPv6, but now with 32 levels instead of 128. Traversing the tree 110 using the leftmost transitions yields the value of "0" 32 times, or the address ":::::::", while traversing the tree 110 using the rightmost transitions yields the value of "f" 32 times, or the address "ffff:ffff:ffff:ffff: ffff:ffff:ffff:ffff".

While 32 levels may offer latency improvements to the 128-level tree of FIG. 1B, computing service implementation details may weigh toward different trees. As a non-limiting example, a data storage service may have a transaction limit of 25 items per transaction. The ability to alter or mutate a tree using native transactions of the data storage service may significantly simplify the implementation of mutations, particularly involving multi-tenancy, which can result in concurrent requests from different customers. A typical tree, by contrast, is not a concurrent data structure and cannot be used in parallel by multiple users. Thus, in various implementations, a prefix allocation tree has a number of levels less than or equal to a maximum number of items per transaction supported by a data storage service.

In various implementations, each parent node in a prefix allocation tree holds references to its child nodes in order to solve the problem of indexing unoccupied space. However, the number of child references grows exponentially as the tree depth decreases. A data storage service may have a constraint that limits due to data size the number of references that can be stored for a given parent node. Therefore, although shallower trees may be preferable, making the tree shallower causes the amount of data stored for each node to increase. Moreover, as the amount of data stored for each node increases, contention increases. The same number of mutations have to happen on a smaller set of data items, and as those items grow larger, those mutations become more input/output (I/O) intensive and take longer to perform.

Figure 1C:
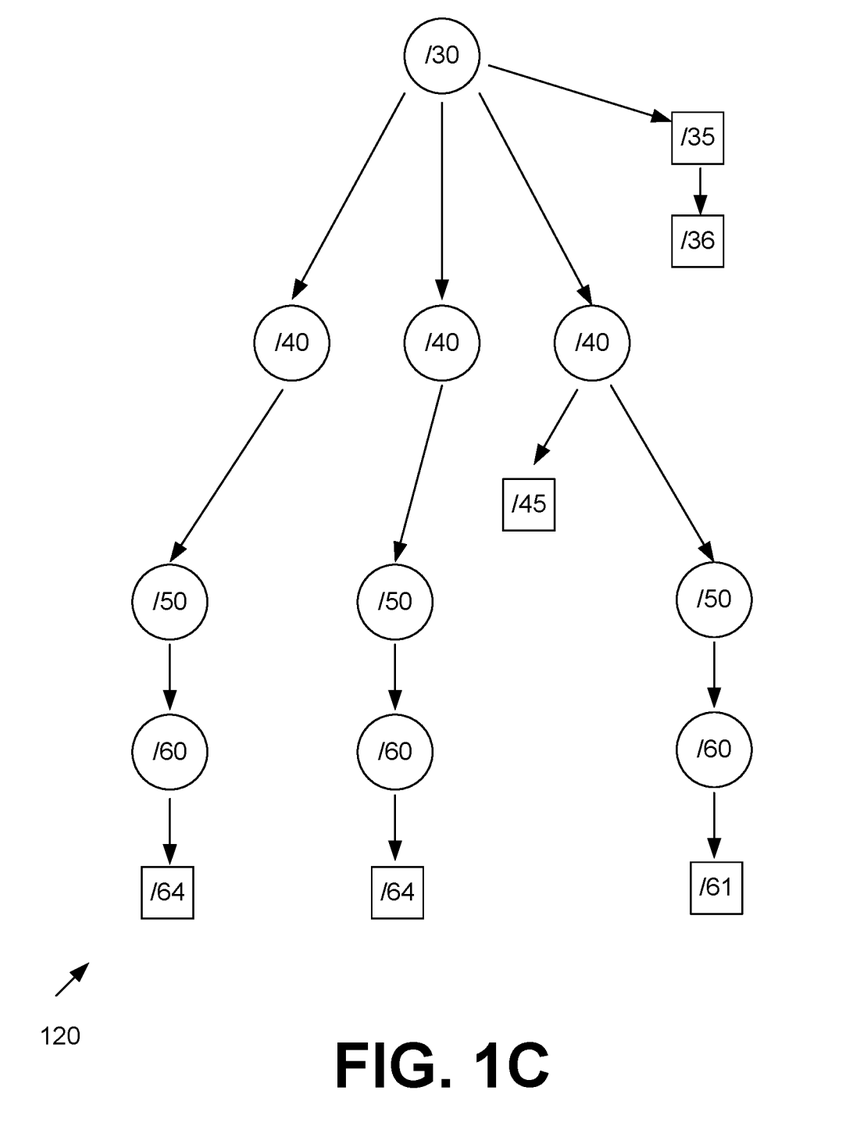

FIG. 1C shows another example of a prefix allocation tree 120 defined by three parameters: a minimum, a maximum, and a stride. The minimum corresponds to the largest network address block that the prefix allocation tree 120 will manage, provided for example in CIDR notation. The maximum corresponds to the smallest network address block that the prefix allocation tree 120 will manage, provided for example in CIDR notation. The stride defines a maximum increase in the number of bits for each level in the prefix allocation tree 120, or the difference between parent and child nodes. Alternatively, the stride may be determined as a maximum distance between parent and child nodes for the prefix allocation tree 120. The stride ensures that nodes appear at predefined places in the tree, even if otherwise not required.

In the non-limiting example prefix allocation tree 120, the minimum is set to "/30", the maximum is set to "/64" (or an increased value), and the stride is set to 10. Here, the root node is a "/30" block, and the root node has three child nodes that are "/40" blocks and one child node that is a "/35" block. Because of the stride being set to 10, the "/30" node can have child nodes from "/31" to "/40". As shown, all circular nodes are considered "on-stride" nodes, while all rectangular nodes are considered "off-stride" nodes. The off-stride nodes can be leaf nodes, with no suballocations, or can allocate blocks but no smaller than the next on-stride node. For example, the "/35" block represented by the off-stride node can allocate blocks between "/35" (itself) and "/39," and here, a "/36" block is shown as a child node. In the example prefix allocation tree 120, the on-stride nodes are "/30", "/40", "/50", and "/60", while the off-stride nodes are "/35", "/45", "/64", and "/61". In the following discussion, a general description of the system and its components is provided, followed by a discussion of the operation of the same.

Figure 2:
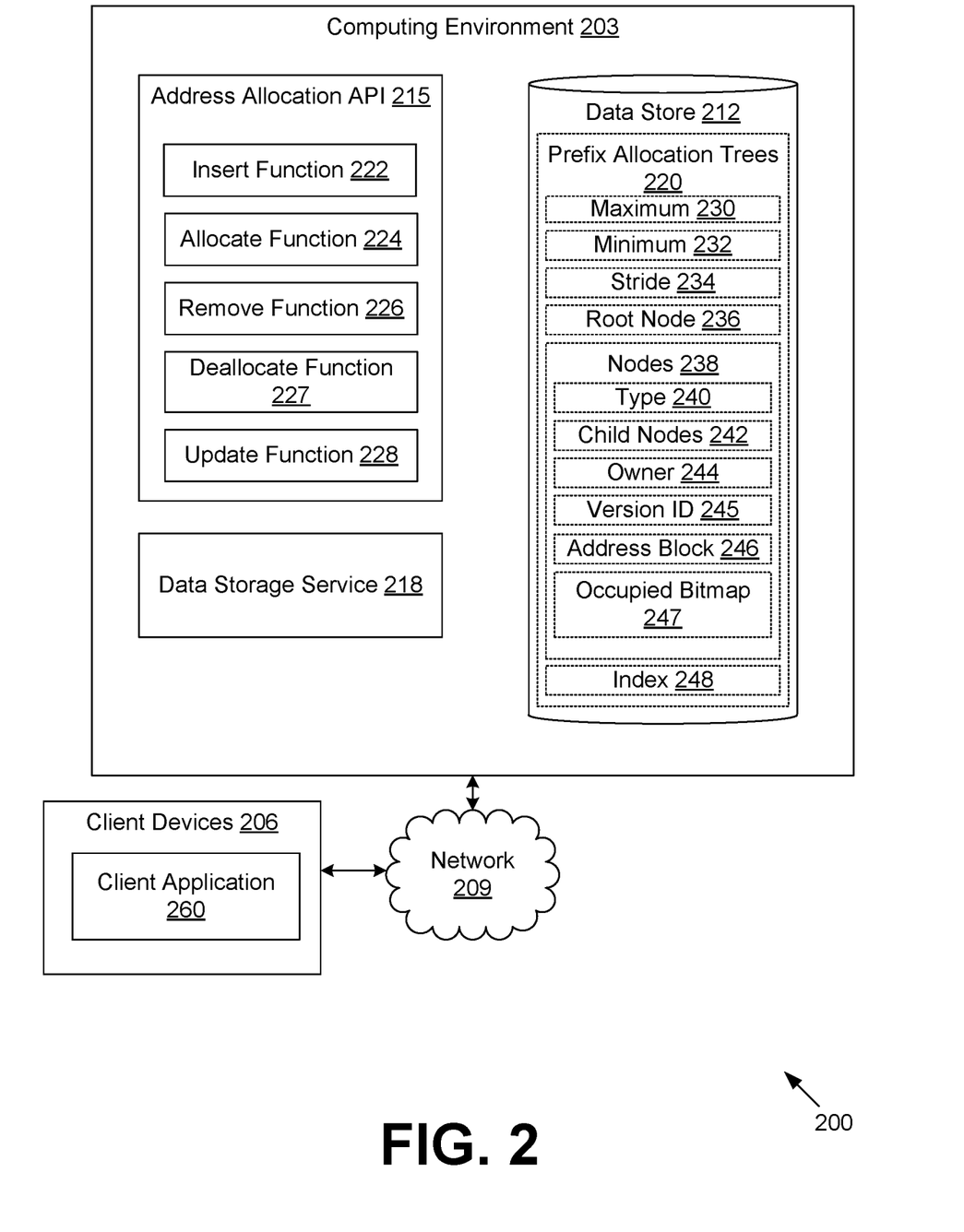
FIG. 2 is a schematic block diagram of a networked environment according to various embodiments of the present disclosure.

With reference to FIG. 2, shown is a networked environment 200 according to various embodiments. The networked environment 200 includes a computing environment 203, and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The networked environment 200 may correspond to a cloud provider network (sometimes referred to simply as a "cloud"), which is a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable loads. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Example regions include U.S. East (located on the east coast of the U.S.), U.S. West (located on the west coast of the U.S.), Europe—London, and Europe—Paris. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) to access resources and services of the cloud provider network. Transit Centers (TCs) are the primary backbone locations linking customers to the networked environment 200, and may be co-located at other network provider facilities (e.g., Internet service providers, telecommunications providers). Each region can operate two TCs for redundancy. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

Generally, the traffic and operations of a cloud provider network may broadly be subdivided into two categories: control plane operations carried over a logical control plane and data plane operations carried over a logical data plane. While the data plane represents the movement of user data through the networked environment 200, the control plane represents the movement of control signals through the networked environment 200. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

In some embodiments, the computing environment 203 may correspond to a virtualized private network within a physical network comprising virtual machine instances executed on physical computing hardware, e.g., by way of a hypervisor. The virtual machine instances may be given network connectivity by way of virtualized network components enabled by physical network components, such as routers and switches.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The applications and/or functionality executed in the computing environment 203 include an address allocation application programming interface (API) 215, a data storage service 218, and/or other applications, systems, services, engines, and/or other functionality. The address allocation API 215 supports various functionality to manage network address allocations backed by prefix allocation trees 220. Functionality provided by the address allocation API 215 may include an insert function 222, an allocate function 224, a remove function 226, a deallocate function 227, an update function 228, and/or other functions. The insert function 222 may take a network address block as an input, as well as other metadata such as ownership, lease time, and so forth. The insert function 222 adds the network address block to the prefix allocation tree 220, such that the block can be allocated to its owner or to other customers as the case may be. For example, the insert function 222 may be called when on-boarding a new customer who already has network address space available, or the insert function 222 may be called when a customer or the cloud provider obtains additional network address space.

The allocate function 224 takes as input a certain size network address block being requested and returns a particular network address block of that given size from the allocatable addresses available to a particular customer. The allocate function 224 may be called when a customer configures a new network, subnetwork, virtual private network, and so forth, for use in the cloud provider network.

The remove function 226 takes as input a particular network address block and removes the network address block from the prefix allocation tree 220. The remove function 226 may be called when the customer's access to the network address block expires, or if the customer requests to release or transfer the network address block. The deallocate function 227 takes as input a particular network address block and updates the network address block in the prefix allocation tree 220 to allocatable from allocated, thereby releasing the network address block to be used in another allocation. The deallocate function 227 may be called when the customer requests to free up the network address block to be reallocated.

The update function 228 takes as input an identification of a particular network address block and one or more parameters to modify the network address block. For example, the update function 228 may be called to transfer ownership of the network address block, to release an allocation of a network address block to make it allocatable, to expand a network address allocation into a contiguous block, or to reallocate a new network address block in place of a particular network address block.

The data storage service 218 may correspond to a cloud service that provides data storage management on behalf of the data store 212. In one implementation, the data storage service 218 may correspond to a distributed hash table with key/value-based operations, such as "put," "get," "delete," and so on. In another embodiment, the data storage service 218 may correspond to a relational database management system. For efficiency, the data storage service 218 may have a constraint on a maximum quantity of data to be stored as a value associated with a key. The data storage service 218 may support eventually consistent reads and/or strongly consistent reads.

The data store 212 includes one or more prefix allocation trees 220 to manage a set of network address allocations. Each prefix allocation tree 220 may include a maximum 230, a minimum 232, a stride 234, a reference to a root node 236, and a plurality of nodes 238. It is noted that individual nodes 238 within the prefix allocation tree 200 may be distributed among multiple computing devices by the data storage service 218 in some embodiments.

The minimum 232 corresponds to the largest network address block (or minimum prefix length) that the prefix allocation tree 220 will hold, for example in CIDR notation. The maximum 230 corresponds to the smallest network address block (or maximum prefix length) that the prefix allocation tree 220 will hold, for example in CIDR notation. The stride 234 defines a maximum increase in the number of bits for each level in the prefix allocation tree 220, or the difference between parent and child nodes. The stride 234 ensures that nodes appear at predefined places in the tree, even if otherwise not required.

The root node 236 is a reference to the node 238 that is the base of the prefix allocation tree 220. In some cases, the prefix allocation tree 220 may have multiple different root nodes 236.

The nodes 238 may include a type 240, references to zero or more child nodes 242, an owner 244, a version identifier 245, an address block 246, an occupied bitmap 247, and/or other data. In various embodiments, the nodes 238 of a prefix allocation tree 220 are of five types 240: interior, allocatable, allocatable-allocated, interior-allocatable, and allocated. Interior nodes 238 are always on-stride bookkeeping nodes 238 that can only have allocatable nodes 238 or allocatable-allocated nodes 238 as children. Allocatable nodes 238 represent a CIDR block that can be used for allocations. Allocatable nodes 238 can only have interior-allocatable and allocated nodes 238 as children. Allocatable-allocated are nodes 238 that represent an allocatable node 238 that has been allocated as a singular block. Interior-allocatable nodes 238 are always on-stride bookkeeping nodes 238 that can only have interior-allocatable or allocated nodes 238 as children. Allocated nodes 238 are nodes 238 that represent a CIDR that has been allocated.

The child nodes 242 correspond to nodes 238 that represent network address blocks within the address block 246 of the node 238, which are allocatable, allocated, or otherwise on-stride bookkeeping nodes 238. If a node 238 is a leaf node, there may be zero child nodes 242. In one implementation, the child nodes 242 correspond to a JavaScript Object Notation (JSON) array of address blocks 246 uniquely identifying the nodes 238 that are children. In another implementation, a compact binary encoding may be used. The child nodes 242 may correspond to a network address prefix bit increase of less than or equal to the stride 234 less a distance from an ancestor on-stride node 238.

The owner 244 corresponds to a user or customer of the cloud provider who is authorized to allocate or make changes to the address block 246 within the node 238. There may be no designated owner, or multiple designated owners for a node 238 that is a top-level node 238 encompassing address blocks 246 of multiple customers. In some cases, the owner 244 may be the cloud provider, for address blocks 246 that are allocatable for the benefit of customers.

The version identifier 245 may include an identifier that is incremented based upon each change or mutation to the node 238. This can be used to ensure consistency upon processing of concurrent requests, such as parallel requests from multiple customers in multi-tenant environments. In some cases, the version identifier 245 also includes a generation identifier that is established upon creation of the node 238 but stays the same for the lifetime of the node 238. In one example, a timestamp is used. Optimistic concurrency can be used by the address allocation API 215 in a node modification transaction such that a transaction with the data storage service 218 is constructed with the version identifiers 245, and if any of the version identifiers 245 have been incremented, the transaction would fail.

The address block 246 corresponds to a segment of network address space. Such network address space may be private or public, where the public network address space may be registered to the owner 244 via a registry, or the owner 244 is a designee of the registrant. If the network address space is private, then the cloud provider may assign certain address blocks 246 to customers where unique use can be assured (e.g., within a subnetwork of a region).

Each node 238 in the prefix allocation tree 220 is uniquely identified by its address block 246. In some implementations, the address block 246 is used as a primary key for the data storage service 218. Where multiple prefix allocation trees 220 are used by a cloud provider or another enterprise network (e.g., different networks in different regions), a pool identifier may be used in conjunction with the address block 246 to avoid collisions.

A prefix allocation tree 220 may also be associated with an index 248 in order to support the allocate function 224. Because each node 238 keeps track of the child nodes 242, each node 238 provides access to determine which address space below the node 238 is free. Space occupied by a child node 242 may be available for allocation, but the child node 242 has authority over the allocation instead of the parent.

In one approach, the index 248 includes an index data structure for each network address prefix length that could be allocated from the prefix allocation tree 220. For example, separate indexes 248 may be created for tracking free "/34" blocks, free "/35" blocks, free "/36" blocks, and so forth. The separate indexes 248 may be implemented in different computing devices for scalability.

In another approach, only a number of index data structures less than or equal to the value of the stride 234 are created. Modular arithmetic is used to assign prefix lengths to particular index data structures. By determining the prefix length modulo the stride 234, no more than the stride 234 value of index data structures are used.

With this index 248, eager allocation may be utilized to select the smallest node 238 with the least amount of free space that will fit the network address block size that is desired to be allocated. For example, assuming a prefix allocation tree 220 with a stride 234 of 8, if a "/32" allocation is desired, the allocate function 224 will first query the index 248 for a free "/32" block. If there are no such nodes 238, the allocate function 224 will then query the index 248 for a "/31" block with the least amount of free "/32" slots. This continues again and again if there are no such nodes 238, until the "/24" is reached, which is an on-stride node 238. If there are no "/24s," the allocate function 224 creates a "/24" interior-allocatable node 238. Suppose the querying of the index 248 continues until the "/20" query indicates that there are 16 free slots for a "/24". Then the allocate function 224 is able to insert a path from the "/20" to the first available "/32" in that node 238.

Continuing with this example, suppose that a "/26" allocation is desired. The index 248 checks the index data structure for the remainder 2 value (26 mod 8 is 2) and determines that there are no nodes 238. The querying continues up to "/24," using the index data structure for the remainder 0 value (24 mod 8 is 0), and the "/24" interior-allocatable node 238 is returned. Then, the "/26" allocation is allocated as an allocated node 238 under the "/24" interior-allocatable node 238.

In one embodiment, the index 248 may also count a number of allocatable nodes 238 of each prefix length within the prefix allocation tree 220. These counts may be updated in constant time and space with each mutation performed under the address allocation API 215. These counts may be used as an optimization to avoid unnecessary querying of index data structures, so that only those index data structures associated with prefix lengths that are available are queried.

The occupied bitmap 247 corresponds to a bitmap used to quickly calculate the free space under a node 238. The occupied bitmap 247 represents a flattened version of the address space for which a node 238 is responsible. For example, in a prefix allocation tree 220 with a minimum 232 of 4 and a stride 234 of 8, a node 238 representing a "/12" block will have a bitmap of 256 Boolean values in an array, one for each "/20" block that can be directly allocated from the "/12" block, where 12 incremented by the stride value equals 20. For each child under the node 238, the corresponding space in the occupied bitmap 247 is marked as occupied. Thus, a "/20" block under the "/12" would take up one space in the 256-space bitmap, a "/19" block under the "/12" would take up two spaces, an "/18" block would take up four spaces, and so on. To determine how many free "/18" blocks are within the "/12" block, the occupied bitmap 247 is scanned four spaces at a time, and the count is incremented when the four spaces are empty. Once a free address block 246 is found, it takes only constant time to determine the start address for the free address block 246.

In some embodiments, the occupied bitmap 247 also includes a second bitmap portion including Boolean values that represent whether the address blocks 246 in the first bitmap portion are contiguous. To illustrate, in the previous example of "/20" blocks, the first two "/20" blocks may be allocated, but the first bitmap portion does not indicate whether the first two "/20" blocks are a contiguous "/19" allocation or separate "/20" allocations. The second bitmap portion may track whether the blocks are contiguous by alternating the Boolean value on transition to a different allocation. For example, if the first two blocks are contiguously allocated, the first two values in the second bitmap portion may be "1" and "1", showing no alternation. However, if the second block is not contiguously allocated, the third value in the second bitmap portion may be "0," showing an alternation. The values would continue with "0" until the next block that is not contiguously allocated is encountered, thereby causing the value to change to "1". In one implementation, values in the second bitmap portion may be omitted for blocks that are not allocated. In one implementation, trailing zeros are omitted to save space, while in another implementation trailing ones are omitted to save space. In various implementations, the value in the second bitmap portion may begin with zero or one.

The client device 206 is representative of a plurality of client devices that may be coupled to the network 209. The client device 206 may comprise, for example, a processor-based system such as a computer system. Such a computer system may be embodied in the form of a server computer, a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices.

The client device 206 may be configured to execute various applications such as a client application 260 and/or other applications. The client application 260 may be executed in a client device 206, for example, to access network content served up by the computing environment 203 and/or other servers. To this end, the client application 260 may comprise, for example, a service client, a browser, a dedicated application, etc. The client device 206 may be configured to execute applications beyond the client application 260 such as, for example, email applications, social networking applications, word processors, spreadsheets, and/or other applications.

Figure 3A:
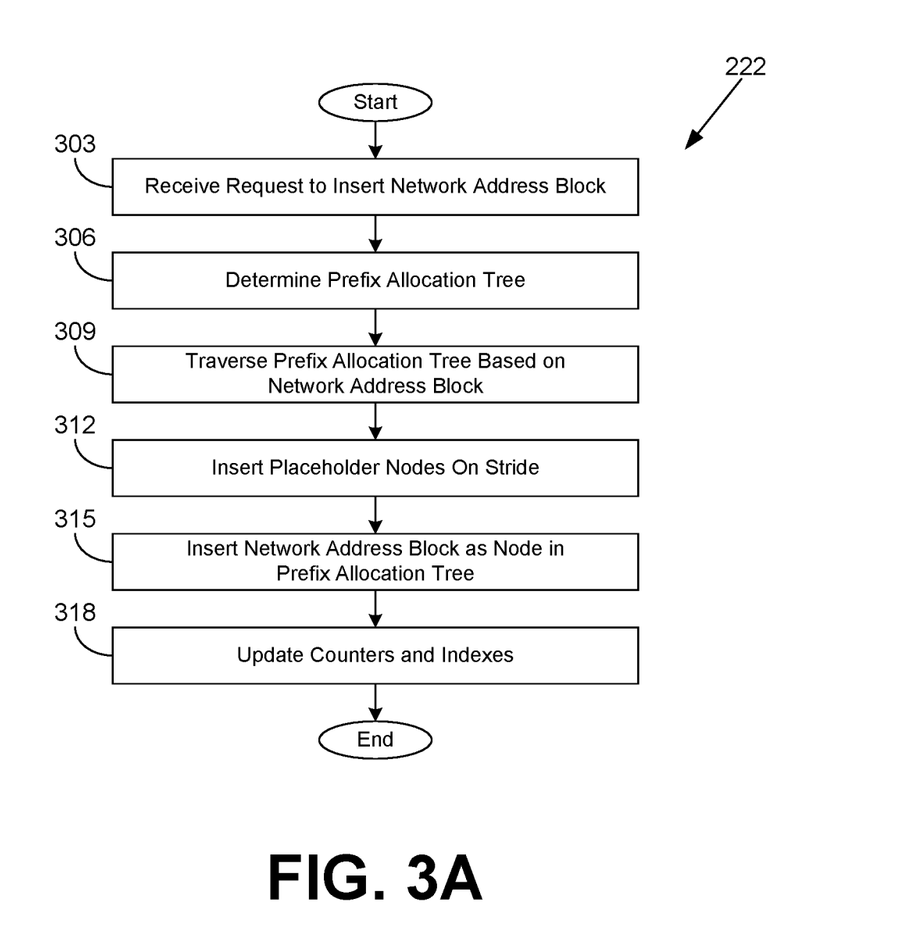
FIG. 3A is a flowchart illustrating one example of functionality implemented as portions of an insert function executed in a computing environment in the networked environment of FIG. 2 according to various embodiments of the present disclosure.

Referring next to FIG. 3A, shown is a flowchart that provides one example of the operation of a portion of the insert function 222 according to various embodiments. It is understood that the flowchart of FIG. 3A provides merely an example of the many different types of functional arrangements that may be employed to implement the operation of the portion of the insert function 222 as described herein. As an alternative, the flowchart of FIG. 3A may be viewed as depicting an example of elements of a method implemented in the computing environment 203 (FIG. 2) according to one or more embodiments.

Beginning with box 303, the insert function 222 receives a request to insert a network address block 246 (FIG. 2) into a prefix allocation tree 220 (FIG. 3). The request may be associated with a user or customer of a cloud provider network. The request may be scoped within a certain address pool of the cloud provider network, which may indicate a particular prefix allocation tree 220 to be modified. The request identifies the address block 246 using a network address prefix in conjunction with a number of bits in the prefix. For example, CIDR notation may be used to identify the address block 246.

In box 306, the insert function 222 determines a prefix allocation tree 220 into which the network address block 246 is inserted. This may include identifying a root node 236 (FIG. 2) of the prefix allocation tree 220, of potentially multiple root nodes 236. The minimum 232 (FIG. 2), if established for the prefix allocation tree 220, may indicate the largest address block 246 for the prefix allocation tree 220, which may in turn impact the address block 246 corresponding to the root node 236.

In box 309, the insert function 222 traverses the prefix allocation tree 220 based at least in part on the address block 246 to be inserted. For example, the insert function 222 may examine the child nodes 242 (FIG. 2) of the root node 236 to determine the corresponding child node 242 that matches the address block 246. The child nodes 242 will be on-stride. That is, their address block 246 prefix bit lengths will be the parent node's prefix bit length plus the stride 234 (FIG. 2), or a value less than the parent node's prefix bit length plus the stride 234. In traversing the prefix allocation tree 220, the insert function 222 repeatedly examines the children of the child nodes 242 until a node 238 (FIG. 2) is reached that has the longest prefix encompassing the address block 246 to be inserted.

In box 312, the insert function 222 may insert one or more placeholder nodes 238 on-stride in the prefix allocation tree 220. This ensures that the difference in length of the prefix (or distance) between nodes 238 is less than or equal to the stride 234.

In box 315, the insert function 222 inserts the address block 246 as a node 238 in the prefix allocation tree 220, with the child nodes 242 of a parent node 238 being updated to include a reference to the new node 238, which is designated to be of type 240 allocatable. The owner 244 (FIG. 2) and the version identifier 245 (FIG. 2) may be added. Version identifiers 245 for the parent node 238 may also be updated. The occupied bitmap 247 (FIG. 2) may be created and initialized with empty or null values.

In box 318, the insert function 222 may update various data structures including one or more indexes 248 (FIG. 2) and one or more counter values. The new node 238 may be added to an index 248 selected based on determining a remainder value from the address block 246 modulo the stride 234. One or more counters may be incremented based upon the newly added allocatable space, including the prefix length of the allocatable address block 246 and up to the minimum 232 (FIG. 2) size of allocatable address blocks 246 contained within it.

Thereafter, the operation of the portion of the insert function 222 ends. It is noted that in some embodiments, boxes 306 through 318 may be constructed as a single transaction or query to be processed by the data storage service 218 in order to reduce latency involved with data retrieval and processing.

Figure 3B:
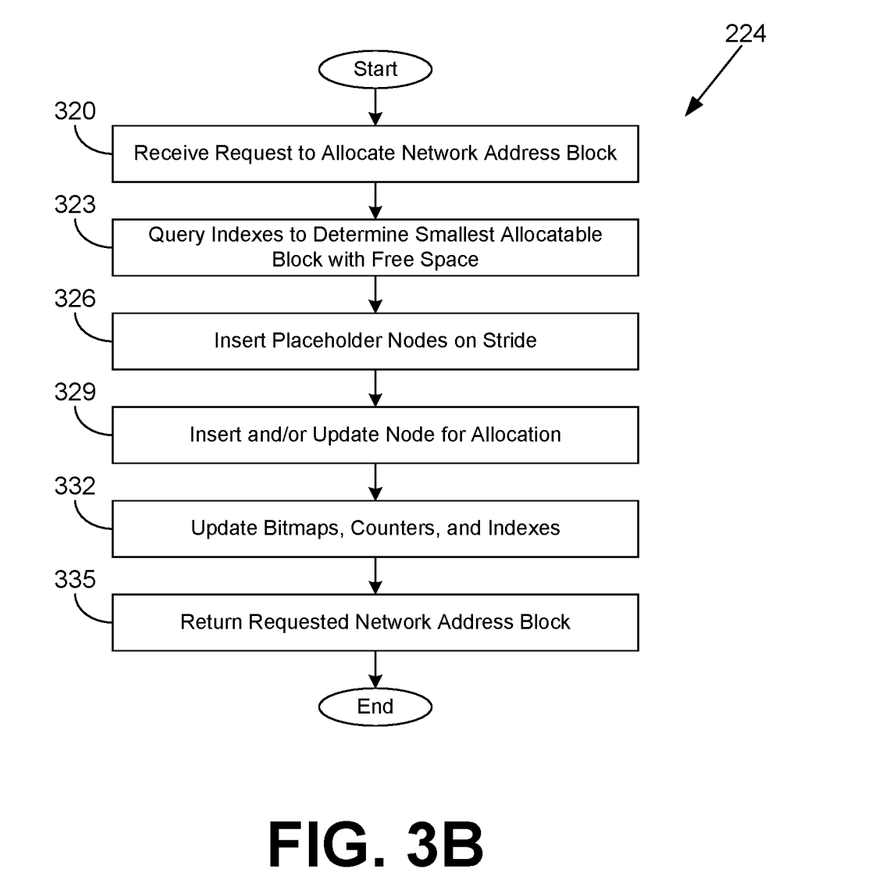
FIG. 3B is a flowchart illustrating one example of functionality implemented as portions of an allocate function executed in a computing environment in the networked environment of FIG. 2 according to various embodiments of the present disclosure.

Continuing to FIG. 3B, shown is a flowchart that provides one example of the operation of a portion of the allocate function 224 according to various embodiments. It is understood that the flowchart of FIG. 3B provides merely an example of the many different types of functional arrangements that may be employed to implement the operation of the portion of the allocate function 224 as described herein. As an alternative, the flowchart of FIG. 3B may be viewed as depicting an example of elements of a method implemented in the computing environment 203 (FIG. 2) according to one or more embodiments.

Beginning with box 320, the allocate function 224 receives a request to allocate a network address block 246 (FIG. 2). The request may specify a certain prefix size or length of the address block 246 to be allocated. For example, the request may specify a "/30" block in CIDR notation. Alternatively, the request may specify a size in terms of number of network addresses. The request may be associated with a particular user or customer of a cloud provider network.

In box 323, the allocate function 224 queries one or more indexes 248 (FIG. 2) to determine a node 238 (FIG. 2) in a prefix allocation tree 220 (FIG. 2) that is the smallest allocatable block with free space that can accommodate the request, and for which the user or customer has permission to make an allocation. The quantity of indexes 248 may correspond to the value of the stride 234 (FIG. 2) for the prefix allocation tree 220, and a particular index 248 to be used may be determined by the remainder value of the target prefix length modulo the stride 234. In other words, a respective one of the plurality of index data structures indexes a subset of the plurality of nodes 238 corresponding to a respective remainder value derived from a respective network address prefix bit length modulo the stride value. The allocate function 224 may start with the target prefix length being equal to the requested prefix length, and then decrement the target prefix length (and use the appropriate index 248) until free space that is allocatable is located. The allocate function 224 may refer to the respective occupied bitmaps 247 (FIG. 2) of the nodes 238 to determine which address blocks 246 are allocatable and allocated.

Once the smallest free space that can accommodate the request is located, the prefix allocation tree 220 is then updated to indicate that the particular network address block 246 is allocated. In box 326, the allocate function 224 may insert one or more placeholder nodes 238 on-stride into the prefix allocation tree 220 beginning with the node 238 having allocatable space. This is to ensure that the prefix length difference, or distance, between the previous on-stride node 238 and the next node 238 does not exceed the stride 234 value.

In box 329, the allocate function 224 inserts a new node 238 and/or updates an existing node 238 in order to make the allocation. For example, a node 238 may already exist corresponding to the requested address block 246, and the allocate function 224 may change it from allocatable to allocated. Alternatively, in subdividing another larger address block 246, the allocate function 224 may create a new allocated node 238 that represents the smaller address block 246 that is allocated. The allocate function 224 may also update version identifiers 245 (FIG. 2) and set an owner 244 (FIG. 2) for the node 238. In adding a node 238, the allocate function 224 may add a reference to the node 238 as a child node 242 (FIG. 2) of a parent node 238.

In box 332, the allocate function 224 may update one or more occupied bitmaps 247, one or more indexes 248, or one or more counter values based upon the allocation. For example, the allocate function 224 may change one or more Boolean values in the occupied bitmaps 247 to indicate which of the on-stride address blocks 246 are allocated, and also which are contiguous allocations. The occupied bitmap 247 may include a first bitmap of Boolean values indicating whether individual ones of a plurality of on-stride network address blocks 246 are either available or allocated, and a second bitmap of Boolean values indicating whether the individual ones of the plurality of on-stride network address blocks 246 that are allocated are of a same contiguous allocation as a preceding allocation in the plurality of on-stride network address blocks 246, and a transition from a first value to a second value in the second bitmap indicates a different allocation.

The allocate function 224 may verify that a respective version number associated with individual ones of a plurality of nodes 238 in the prefix allocation tree 220 has not been incremented during the course of the transaction to implement optimistic concurrency. In box 335, the allocate function 224 returns an identifier of the requested network address block 246 that has been allocated. Thereafter, the operation of the portion of the allocate function 224 ends.

Figure 4:
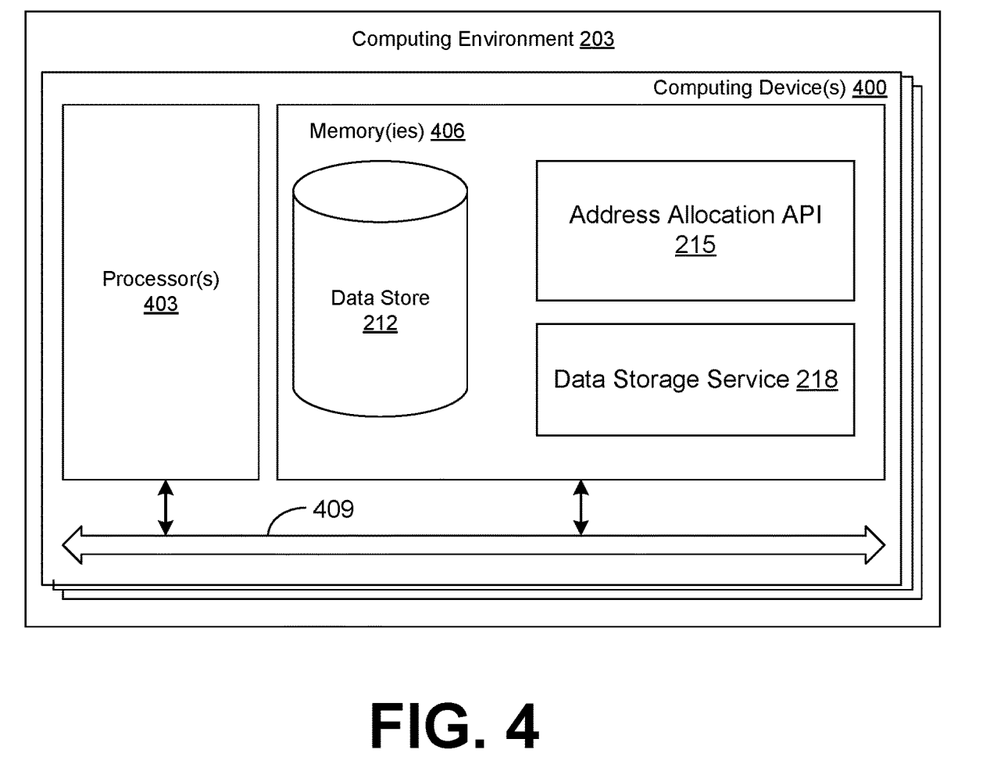
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the address allocation API 215, the data storage service 218, and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic©, Python©, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the address allocation API 215, the data storage service 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-3B show the functionality and operation of an implementation of portions of the address allocation API 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A-3B show a specific order of execution, it is understood that the order of execution may differ from that which is depicted. For example, the order of execution of two or more blocks may be scrambled relative to the order shown. Also, two or more blocks shown in succession in FIGS. 3A-3B may be executed concurrently or with partial concurrence. Further, in some embodiments, one or more of the blocks shown in FIGS. 3A-3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the address allocation API 215 and the data storage service 218, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the address allocation API 215 and the data storage service 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a cloud provider network;
   a data storage service in the cloud provider network storing a prefix allocation tree, the prefix allocation tree comprising:
     a stride value representing a maximum distance between parent and child nodes in the prefix allocation tree; and
     a plurality of nodes individually corresponding to at least one of: an allocatable network address block, an allocated network address block, or an on-stride placeholder node, individual ones of the plurality of nodes containing a reference to one or more child nodes of the plurality of nodes that correspond to a network address prefix bit increase of less than or equal to the stride value less a distance from an ancestor on-stride node;
   at least one computing device in the cloud provider network; and
   an address allocation application programming interface (API) executable in the at least one computing device, wherein when executed the address allocation API causes the at least one computing device to at least:
     receive a request to allocate a network address block in the cloud provider network, the request specifying a prefix size for the network address block;
     determine a particular network address block having the prefix size that is allocatable based at least in part on the prefix allocation tree;
     update the prefix allocation tree to indicate that the particular network address block is allocated; and
     return an identification of the particular network address block in response to the request to allocate the network address block.

2. The system of claim 1, wherein the data storage service stores the prefix allocation tree in a distributed hash table using network address blocks represented by the plurality of nodes as primary keys.

3. The system of claim 1, wherein one or more of the plurality of nodes include a first bitmap of Boolean values indicating whether individual ones of a plurality of on-stride network address blocks are either available or allocated, and a second bitmap of Boolean values indicating whether the individual ones of the plurality of on-stride network address blocks that are allocated are of a same contiguous allocation as a preceding allocation in the plurality of on-stride network address blocks, and a transition from a first value to a second value in the second bitmap indicates a different allocation.

4. The system of claim 1, wherein the prefix allocation tree further comprises a plurality of index data structures, a quantity of the plurality of index data structures corresponding to the stride value, wherein a respective one of the plurality of index data structures indexes a subset of the plurality of nodes corresponding to a respective remainder value derived from a respective network address prefix bit length modulo the stride value.

5. The system of claim 1, wherein the prefix allocation tree further comprises a minimum value representing a largest network address block managed by the prefix allocation tree, and a maximum value representing a smallest network address block managed by the prefix allocation tree.

6. A computer-implemented method, comprising:
   receiving, by an address allocation application programming interface (API) executable in at least one computing device in a cloud provider network, a request to allocate a network address block in the cloud provider network, the request specifying a prefix size for the network address block;
   determining, by the address allocation API, a particular network address block having the prefix size that is allocatable based at least in part on a prefix allocation tree stored by a data storage service in the cloud provider network, the prefix allocation tree comprising:
     a stride value representing a maximum distance between parent and child nodes in the prefix allocation tree; and
     a plurality of nodes individually corresponding to at least one of: an allocatable network address block, an allocated network address block, or an on-stride placeholder node, individual ones of the plurality of nodes containing a reference to one or more child nodes of the plurality of nodes that correspond to a network address prefix bit increase of less than or equal to the stride value less a distance from an ancestor on-stride node;
   updating, by the address allocation API, the prefix allocation tree to indicate that the particular network address block is allocated; and
   returning, by the address allocation API, an identification of the particular network address block in response to the request to allocate the network address block.

7. The computer-implemented method of claim 6, further comprising storing, by the data storage service, the prefix allocation tree in a distributed hash table using network address blocks represented by the plurality of nodes as primary keys.

8. The computer-implemented method of claim 6, wherein one or more of the plurality of nodes include a first bitmap of Boolean values indicating whether individual ones of a plurality of on-stride network address blocks are either available or allocated, and a second bitmap of Boolean values indicating whether the individual ones of the plurality of on-stride network address blocks that are allocated are of a same contiguous allocation as a preceding allocation in the plurality of on-stride network address blocks, and a transition from a first value to a second value in the second bitmap indicates a different allocation.

9. The computer-implemented method of claim 6, wherein the prefix allocation tree further comprises a plurality of index data structures, a quantity of the plurality of index data structures corresponding to the stride value, wherein a respective one of the plurality of index data structures indexes a subset of the plurality of nodes corresponding to a respective remainder value derived from a respective network address prefix bit length modulo the stride value.

10. The computer-implemented method of claim 6, wherein the prefix allocation tree further comprises a minimum value representing a largest network address block managed by the prefix allocation tree.

11. The computer-implemented method of claim 6, wherein the prefix allocation tree further comprises a maximum value representing a smallest network address block managed by the prefix allocation tree.

12. The computer-implemented method of claim 6, further comprising updating, by the address allocation API, a counter value corresponding to a quantity of allocatable network address blocks of the prefix size in the prefix allocation tree in response to updating the prefix allocation tree to indicate that the particular network address block is allocated.

13. The computer-implemented method of claim 6, further comprising:
  receiving, by the address allocation API, a request to insert an additional network address block into the prefix allocation tree; and
  updating, by the address allocation API, the prefix allocation tree to indicate that the additional network address block is allocatable.

14. The computer-implemented method of claim 13, wherein updating the prefix allocation tree to indicate that the additional network address block is allocatable further comprises:
  adding an on-stride placeholder node to the prefix allocation tree; and
  adding an allocatable node corresponding to the additional network address block to the prefix allocation tree as a child node of the on-stride placeholder node.

15. A non-transitory computer-readable medium storing instructions executable by at least one computing device of a cloud provider network, wherein the instructions cause the at least one computing device to at least:
  receive, by an address allocation application programming interface (API), a request to allocate a network address block in the cloud provider network, the request specifying a prefix size for the network address block;
  determine, by the address allocation API, a particular network address block having the prefix size that is allocatable based at least in part on a prefix allocation tree stored by a data storage service in the cloud provider network, the prefix allocation tree comprising:
    a stride value representing a maximum distance between parent and child nodes in the prefix allocation tree; and
    a plurality of nodes individually corresponding to at least one of: an allocatable network address block, an allocated network address block, or an on-stride placeholder node, individual ones of the plurality of nodes containing a reference to one or more child nodes of the plurality of nodes that correspond to a network address prefix bit increase of less than or equal to the stride value less a distance from an ancestor on-stride node;
  update, by the address allocation API, the prefix allocation tree to indicate that the particular network address block is allocated; and
  return, by the address allocation API, an identification of the particular network address block in response to the request to allocate the network address block.

16. The non-transitory computer-readable medium of claim 15, wherein the prefix allocation tree is stored in a distributed hash table using network address blocks represented by the plurality of nodes as primary keys.

17. The non-transitory computer-readable medium of claim 15, wherein one or more of the plurality of nodes include a first bitmap of Boolean values indicating whether individual ones of a plurality of on-stride network address blocks are either available or allocated, and a second bitmap of Boolean values indicating whether the individual ones of the plurality of on-stride network address blocks that are allocated are of a same contiguous allocation as a preceding allocation in the plurality of on-stride network address blocks, and a transition from a first value to a second value in the second bitmap indicates a different allocation.

18. The non-transitory computer-readable medium of claim 15, wherein the prefix allocation tree further comprises a plurality of index data structures, a quantity of the plurality of index data structures corresponding to the stride value, wherein a respective one of the plurality of index data structures indexes a subset of the plurality of nodes corresponding to a respective remainder value derived from a respective network address prefix bit length modulo the stride value.

19. The non-transitory computer-readable medium of claim 15, wherein the prefix allocation tree further comprises a minimum value representing a largest network address block managed by the prefix allocation tree.

20. The non-transitory computer-readable medium of claim 15, wherein the prefix allocation tree further comprises a maximum value representing a smallest network address block managed by the prefix allocation tree.

* * * * *